(12) United States Patent
Lee et al.

(10) Patent No.: US 9,142,854 B2
(45) Date of Patent: Sep. 22, 2015

(54) BATTERY HAVING ENHANCED ELECTRICAL INSULATION CAPABILITY

(75) Inventors: Jin Soo Lee, Daejeon (KR); Kil Young Lee, Daejeon (KR); Dong Myung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 12/935,545

(22) PCT Filed: Feb. 27, 2009

(86) PCT No.: PCT/KR2009/000947
§ 371 (c)(1), (2), (4) Date: Sep. 29, 2010

(87) PCT Pub. No.: WO2009/128605
PCT Pub. Date: Oct. 22, 2009

(65) Prior Publication Data
US 2011/0027636 A1    Feb. 3, 2011

(30) Foreign Application Priority Data

Apr. 17, 2008 (KR) .................. 10-2008-0035639

(51) Int. Cl.
*H01M 10/0587* (2010.01)
*H01M 10/04* (2006.01)
(Continued)

(52) U.S. Cl.
CPC ........ *H01M 10/0431* (2013.01); *H01M 2/1673* (2013.01); *H01M 2/263* (2013.01); *H01M 10/0587* (2013.01); *Y02E 60/122* (2013.01)

(58) Field of Classification Search
USPC .......................................... 429/94
See application file for complete search history.

(56) References Cited

U.S. PATENT DOCUMENTS 5,965,290 A * 10/1999 Shimizu et al. ................ 429/94
2002/0004171 A1 * 1/2002 Kimijima et al. ............. 429/246
(Continued)

FOREIGN PATENT DOCUMENTS

CN    1574422 A    2/2005
CN    1604360 A    4/2005
(Continued)

OTHER PUBLICATIONS

Derwent Abstract of KR 2004065788.*
(Continued)

*Primary Examiner* — Patrick Ryan
*Assistant Examiner* — Lucas J O Donnell
(74) *Attorney, Agent, or Firm* — Birch, Stewart, Kolasch & Birch, LLP

(57) ABSTRACT

Disclosed is a battery including a cathode and an anode wound to face each other with a separator interposed therebetween. Both surfaces of a cathode collector are provided with cathode active-material coating layers so as not to provide a cathode uncoated part at a winding beginning portion of the cathode. The cathode uncoated part for installation of a cathode lead is provided only at a winding ending portion of the cathode. An insulator tape is attached to the boundary of the cathode active-material coating layer facing the anode at the winding ending portion of the cathode. Providing the insulator tape to the boundary of the cathode active-material coating layer at a position where a non-coating part not containing the cathode active-material coating layer and an anode active-material coating layer face each other achieves enhanced electrical insulation capability and consequential safety of the battery.

17 Claims, 9 Drawing Sheets

(51) Int. Cl.
*H01M 2/16* (2006.01)
*H01M 2/26* (2006.01)

(56) References Cited

U.S. PATENT DOCUMENTS

| | | | |
|---|---|---|---|
| 2003/0072993 A1* | 4/2003 | Kim et al. | 429/94 |
| 2003/0099880 A1 | 5/2003 | Park et al. | |
| 2004/0202928 A1* | 10/2004 | Miyamoto et al. | 429/137 |
| 2005/0003264 A1 | 1/2005 | Oh et al. | |
| 2005/0058896 A1* | 3/2005 | Nomura et al. | 429/142 |
| 2005/0069764 A1 | 3/2005 | Kodama et al. | |
| 2005/0175892 A1* | 8/2005 | Mizutani | 429/164 |
| 2006/0003221 A1 | 1/2006 | Yeo | |
| 2006/0051662 A1* | 3/2006 | Kwak et al. | 429/142 |
| 2006/0154139 A1 | 7/2006 | Fujikawa et al. | |
| 2006/0269835 A1* | 11/2006 | Song | 429/142 |
| 2007/0059593 A1* | 3/2007 | Kim et al. | 429/162 |
| 2007/0172726 A1* | 7/2007 | Miller et al. | 429/142 |
| 2007/0224493 A1 | 9/2007 | Higuchi et al. | |
| 2008/0280197 A1* | 11/2008 | Machida | 429/129 |
| 2009/0092889 A1* | 4/2009 | Hwang et al. | 429/94 |
| 2010/0285342 A1* | 11/2010 | Lee et al. | 429/94 |
| 2011/0014509 A1* | 1/2011 | Kim | 429/94 |

FOREIGN PATENT DOCUMENTS

| | | |
|---|---|---|
| CN | 1713418 A | 12/2005 |
| CN | 1753204 A | 3/2006 |
| EP | 1641057 A2 | 3/2006 |
| JP | 2003-109669 A | 4/2003 |
| JP | 2004-259625 A | 9/2004 |
| JP | 2006-196248 A | 7/2006 |
| JP | 2007-123009 A | 5/2007 |
| KR | 10-2003-0042578 A | 6/2003 |
| KR | 10-2006-0118955 A | 11/2006 |
| KR | 10-2007-0096882 A | 10/2007 |

OTHER PUBLICATIONS

International Search Report for PCT/KR2009/000947 mailed Oct. 12, 2009.

* cited by examiner

BATTERY HAVING ENHANCED ELECTRICAL INSULATION CAPABILITY

TECHNICAL FIELD

The present invention relates to a battery having enhanced electrical insulation capability, and more particularly, to a battery wherein an insulator tape is attached to the boundary of a cathode active-material coating layer at a position where an anode active-material coating layer faces a cathode uncoated part where no cathode active-material coating layer is present, achieving enhanced electrical insulation capability and consequential safety of the battery.

BACKGROUND ART

Conventionally, differently from a primary battery having no charge ability, a rechargeable secondary battery having charge and discharge characteristics is actively under study with the development of advanced technologies including digital cameras, cellular phones, laptop computers, hybrid cars, etc. Examples of the secondary battery include a nickel-cadmium battery, nickel-metal hydride battery, nickel-hydrogen battery, a lithium secondary battery, etc.

Of the above-mentioned secondary batteries, a lithium secondary battery has an actuation voltage of 3.6V or more. The lithium secondary battery may be utilized as a power source for portable electronic appliances, or may be utilized in high-power hybrid cars when a plurality of lithium secondary batteries are connected in series. Since the lithium secondary battery has a higher actuation voltage three times that of the nickel-cadmium battery or nickel-metal hydride battery and also, has superior energy density per unit weight, the use of the lithium secondary battery is rapidly increasing.

At present, a lithium ion battery has been fabricated, wherein a cathode and an anode, which are insulated by a separator interposed therebetween, are wound into a cylindrical or prismatic electrode assembly, and after the resulting electrode assembly is inserted into a metal can, an electrolyte is injected into the metal can. As the metal can is sealed, the fabrication of the lithium ion battery is completed.

More particularly, a conventional lithium ion battery includes a cathode in which a cathode active-material coating layer is provided on one surface or both surfaces of a cathode collector, and an anode in which an anode active-material coating layer is provided on one surface or both surfaces of an anode collector, the cathode and anode being wound with a plurality of separators interposed therebetween.

In the case where active-material coating layers are provided on both surfaces of an electrode collector, the active-material coating layer provided on one surface of the electrode collector is generally shorter than the active-material coating layer provided on the other surface of the electrode collector. Typically, it is desirable that a length and width of an anode be longer than a length and width of a cathode, to prevent extraction of lithium ions from the cathode.

FIG. 1 is a sectional view of a conventional battery, and FIG. 2 illustrates a "jelly-roll" configuration of the wound battery. Considering the configuration of the conventional battery in detail with reference to the drawings, the battery includes a cathode in which cathode active-material coating layers 20a and 20b are provided on at least one surface of a cathode collector 10, an anode in which anode active-material coating layers 40a and 40b are provided on at least one surface of an anode collector 30, and a plurality of separators 50a and 50b interposed between the cathode and the anode.

At least one of a winding beginning portion and winding ending portion of the cathode collector 10 or anode collector 30 contains a cathode uncoated part 10' or anode uncoated part 30' where no electrode active-material coating layer is present. These uncoated parts 10' and 30' are provided with electrode leads 60 and 70 to be connected to exterior terminals. Both the electrode leads, i.e. a cathode lead 60 and an anode lead 70 are arranged in the same direction.

When the cathode active-material coating layer 20a comes into contact with the anode with the separator interposed therebetween, the cathode active-material coating layer 20a must overlap the facing anode active-material coating layer 40b (in other words, must have a smaller area than that of the anode active-material coating layer 40b), in consideration of a winding deviation and positional change caused upon charge and discharge of the battery. Under this condition, the boundary between the cathode active-material coating layer and the cathode uncoated part 10' comes across the anode active-material coating layer 40b. This causes micro-holes or shrinkage and damages to other functions of the facing separator 50, resulting in significant heat emission upon contact between the anode active-material coating layer 40b and the cathode uncoated part 10'.

Meanwhile, when the anode and cathode active-material coating layer come into contact with each other under the occurrence of short circuit, there exist a negligible short circuit current and heat emission because of a high electric resistance of the cathode active-material coating layer. However, when the anode comes into contact with the cathode uncoated part (i.e. a part of the cathode collector where no cathode active-material coating layer is present), an insufficient electric resistance causes a serious short circuit current and heat emission which act as dangerous factors significantly deteriorating safety of the battery.

To solve the above-described problems, conventionally, a method for providing insulators 90a, 90b, 90c and 90d at the boundary of the cathode active-material coating layer for preventing short circuit in facing region between the cathode uncoated part and the anode has been adopted.

Referring to FIG. 2 illustrating the jelly-roll wound configuration of the battery shown in FIG. 1, front and rear sides of the cathode lead 60 face the anode uncoated part or the anode active-material coating layer, respectively, with only one layer of separator interposed therebetween. Therefore, either side of the cathode lead 60 has a necessity for an additional insulator for the purpose of preventing short circuit.

Further, since a beginning portion or ending portion of the cathode active-material coating layer faces the anode active-material coating layer with only one layer of separator interposed therebetween, it is necessary to provide an insulator therebetween for the purpose of preventing short circuit.

With respect to the anode lead 70, it comes into contact, at opposite sides thereof, with the anode with six layers of separators and two layers of separators interposed therebetween, respectively. Therefore, there is no necessity for an additional insulator. Similar to the anode lead 70, both surfaces of a winding beginning portion of the anode come into contact with another region of the anode with six layers of separators and two layers of separators interposed therebetween, respectively, eliminating a necessity for an additional insulator.

However, a beginning portion and distal end of the anode coating layer faces the cathode uncoated part or cathode active-material coating layer with only one layer of the separator interposed therebetween and therefore, it is necessary to provide an additional insulator due to a risk of short circuit.

DISCLOSURE OF INVENTION

Technical Problem

Therefore, the present invention has been made to solve a problem of short circuit caused when a non-coating part of one electrode where no active material is present faces the other electrode.

To prevent short circuit between one electrode and the other electrode facing each other and consequential deterioration in electrical insulation capability, the present invention proposes that a cathode lead and anode lead are arranged in opposite directions, rather than being arranged in the same direction, to prevent a cathode uncoated part from facing an anode, and that a cathode is not provided, at a side thereof opposite to the cathode lead, with the cathode uncoated part as a non-coating part containing no cathode active-material coating layer, so as to eliminate a risk of short circuit caused when the cathode uncoated part faces the anode. When the cathode uncoated part is provided as occasion demands, the present invention proposes to provide an additional insulator tape at the cathode uncoated part. Furthermore, in consideration of a risk of short circuit caused when only one surface of the cathode is coated with a cathode active-material and a non-coating part provided at the other surface of the cathode faces an anode active-material coating layer, an insulator tape is additionally attached to the boundary of the cathode active-material coating layer.

Accordingly, it is an object of the present invention to provide a battery having enhanced electrical insulation capability.

Technical Solution

In accordance with the present invention, the above and other objects can be accomplished by the provision of a battery including: a cathode having a cathode active-material coating layer provided on at least one surface of a cathode collector; and an anode having an anode active-material coating layer provided on at least one surface of an anode collector, the cathode and anode being wound to face each other with a separator interposed therebetween, wherein both upper and lower surfaces of the cathode collector are provided with cathode active-material coating layers so as not to provide a cathode uncoated part at a winding beginning portion of the cathode, and the cathode uncoated part for installation of a cathode lead is provided only at a winding ending portion of the cathode, and wherein an insulator tape is attached to the boundary of the cathode active-material coating layer facing the anode at the winding ending portion of the cathode.

Advantageous Effects

In a battery designed such that a cathode is not provided on at least one side thereof with a cathode uncoated part, it is possible to eliminate a risk of short circuit between the cathode and an anode arranged facing the cathode. According to the present invention, even if the cathode uncoated part is provided as occasion demands, an insulator tape is provided at the cathode uncoated part, so as to eliminate a risk of short circuit due to the cathode uncoated part. Further, according to the present invention, an insulator tape is attached to the boundary of a cathode active-material coating layer at a position where an anode active-material coating layer faces a non-coating part not containing the cathode active-material coating layer, achieving enhanced electrical insulation capability and safety of the battery.

BRIEF DESCRIPTION OF DRAWINGS

The above and other objects, features, and other advantages of the present invention will be more clearly understood from the following detailed description taken in conjunction with the accompanying drawings, in which.

BEST MODE FOR CARRYING OUT THE INVENTION

Hereinafter, the present invention will be described in more detail with reference to the accompanying drawings.

Figure 3:
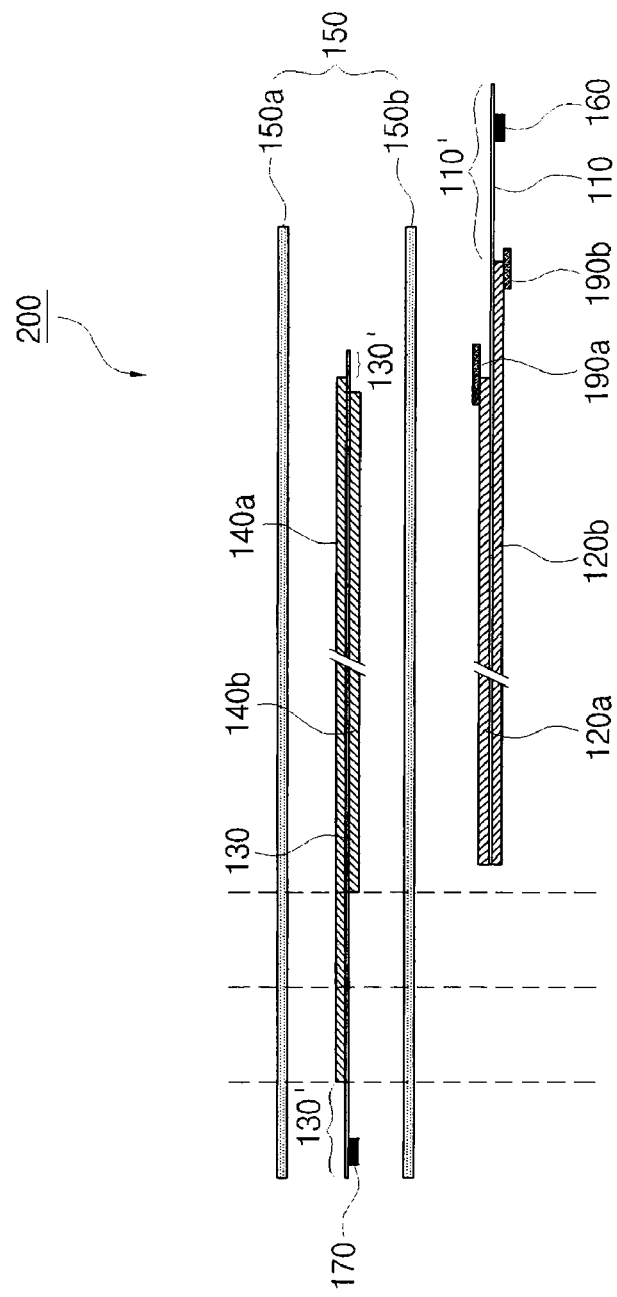
FIGS. 3 and 4 are views illustrating a configuration of a battery and a jelly-roll wound configuration of the battery according to a first embodiment of the present invention.

Referring to FIG. 3 illustrating an electrode configuration according to the present invention, a cathode having a cathode active-material coating layer provided on at least one surface of a cathode collector, and an anode having an anode active-material coating layer provided on at least one surface of an anode collector are wound to face each other with a separator interposed therebetween.

The cathode includes cathode active-material coating layers 120a and 120b on both upper and lower surfaces of a cathode collector 110, respectively. The cathode collector 110 is provided, in at least one direction thereof, preferably, at a winding ending portion thereof, with a cathode uncoated part 110' for installation of a cathode lead 160, the cathode uncoated part 110' being a non-coating part where no cathode active-material coating layer is present. With respect to the other direction of the cathode collector 110 not containing the cathode lead 160, there exists no cathode uncoated part in which at least one surface of the cathode collector 110 is not coated with a cathode active-material.

Specifically, since the cathode uncoated part may act as a dangerous factor to significantly deteriorate safety of the battery due to short circuit current and high heat emission caused as an anode comes into contact with the cathode uncoated part, omission of the cathode uncoated part has the effect of preventing short circuit. The above-described configuration of the cathode may be realized via, for example, a block-cutting method, or a two-step cutting method wherein a cathode uncoated part not containing the cathode active-material coating layer is cut once and thereafter, the cathode active-material coating layer is cut.

The anode according to the present invention includes anode active-material coating layers 140a and 140b on both upper and lower surfaces of an anode collector 130, respectively. At least one side, i.e. a winding beginning portion or winding ending portion of the anode collector 130 is defined with an anode uncoated part 130' not containing the anode active-material coating layers 140a and 140b. An anode lead 170 to be connected to an exterior terminal is connected to the anode uncoated part 130'.

In the present invention, the cathode lead 160 and anode lead 170 are arranged in opposite directions, rather than being arranged in the same direction as described with relation to the prior art. This arrangement is proposed to prevent short circuit caused when the cathode lead and anode lead are arranged in the same direction to face each other with one layer of separator interposed therebetween. When the cathode lead 160 and anode lead 170 are arranged in opposite directions according to the present invention, the cathode lead 160 is located at a winding distal end to face the cathode, eliminating a risk of short circuit.

The separator is positioned to extend lengthwise beyond an ending portion of the anode, to prevent short circuit between the cathode and the anode even if the separator undergoes shrinkage upon receiving heat. Preferably, the separator further extends from the ending portion of the anode by a length of at least 5 mm or more.

In the above-described configuration of the present invention as can be seen from the configuration shown in FIG. 3, with respect to a winding beginning portion of the cathode collector 110 where the cathode uncoated part, containing no cathode active-material coating layer, is not present, the anode active-material coating layers 140a and 140b on the upper and lower surfaces of the anode collector 130 come into contact with the cathode active-material coating layers 120a and 120b provided on the upper and lower surfaces of the cathode collector 110 with separators 150a and 150b interposed therebetween, having no risk of short circuit between the cathode and the anode.

With respect to a winding ending portion of the anode collector 130, the anode active-material coating layer 140a provided on the upper surface of the anode collector 130 comes into indirect contact with the boundary of the cathode active-material coating layer 120b provided on the lower surface of the cathode collector 110 where the cathode lead 160 is installed with the separator 150a interposed therebetween. In this case, an insulator tape 190b is attached to the boundary of the cathode active-material coating layer 120b, so as to prevent short circuit between the cathode uncoated part 110' not containing the cathode active-material coating layer and the anode active-material coating layer 140a.

In addition, with respect to the winding ending portion of the anode collector 130, the anode active-material coating layer 140b provided on the lower surface of the anode collector 130 comes into indirect contact with the boundary of the cathode active-material coating layer 120a on the upper surface of the cathode collector 110 where the cathode lead 160 is installed with the separator 150b interposed therebetween. In this case, an insulator tape 190a is attached to the boundary of the cathode active-material coating layer 120b, so as to prevent the anode active-material coating layer 140b from coming into contact with a non-coating part not containing the cathode active-material coating layer.

Hereinafter, exemplary embodiments of the present invention will be described in more detail with reference to the accompanying drawings, wherein the cathode, anode and separator are wound on a winding mandrel. Of course, it will be appreciated that the present invention is not limited to these embodiments.

Figure 4:
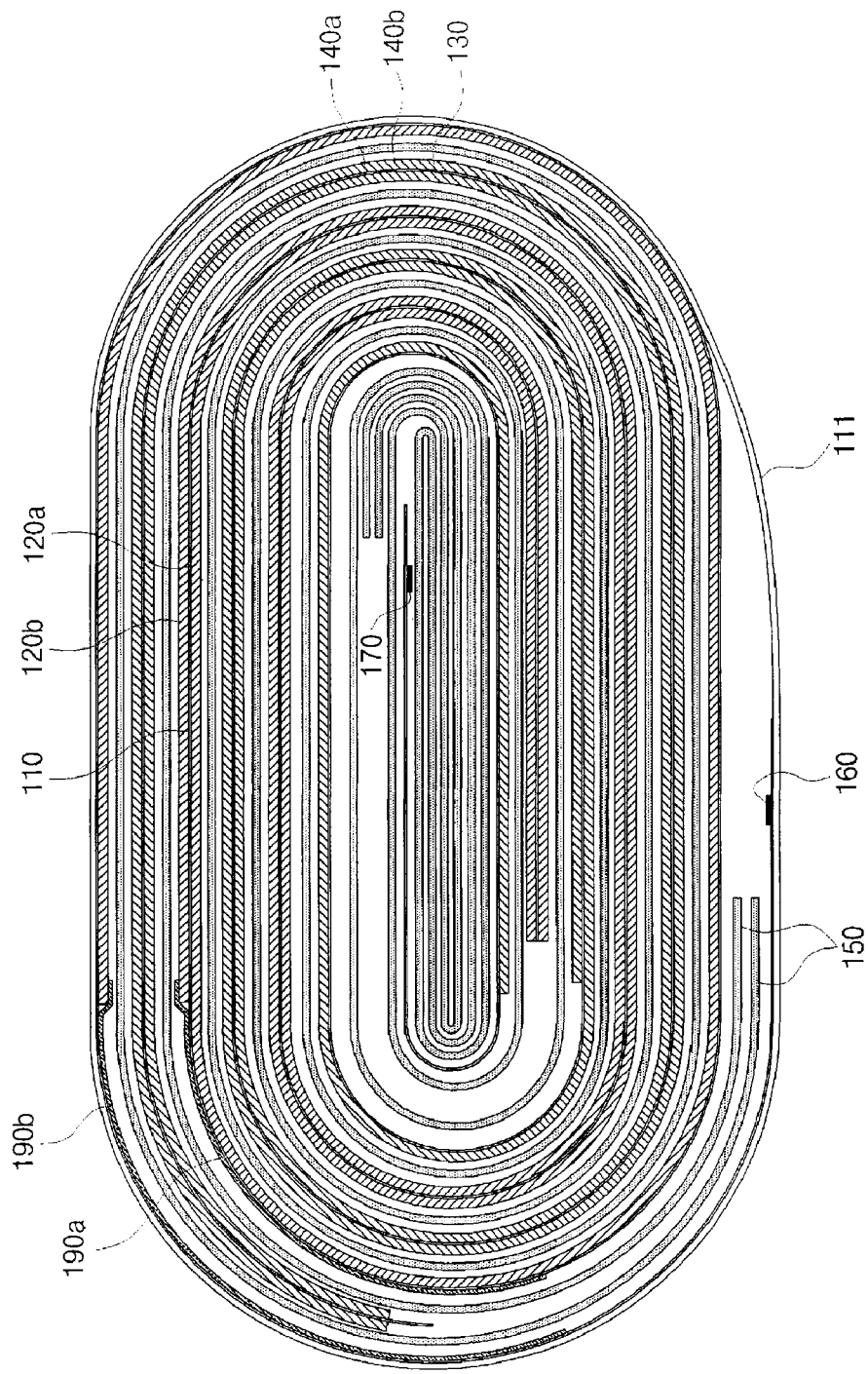

FIGS. 3 and 4 are, respectively, a sectional view of a battery and a view illustrating a jelly-roll wound configuration of the battery according to a first embodiment of the present invention.

Referring to FIG. 4 illustrating the jelly-roll wound configuration of the battery, a cathode of the present embodiment does not contain a cathode uncoated part at a winding beginning portion thereof, and upon winding, cathode active-material coating layers on upper and lower surfaces of a cathode collector come into contact with anode active-material coating layers, respectively, with one layer of separator interposed therebetween. The winding beginning portion of the cathode may be realized via, for example, a block-cutting method, or a two-step cutting method wherein the cathode uncoated part not containing the cathode active-material coating layer is cut once and thereafter, the cathode active-material coating layer is cut.

A cut face of an anode uncoated part 130' provided at the winding beginning portion of the anode is provided at opposite sides thereof with several layers of separators, achieving enhanced safety against burrs on the cut face. Further, with respect to the winding ending portion of the anode, although either side of a cut face of the anode uncoated part faces the cathode with only one layer of separator interposed therebetween, provision of the insulator tapes 190a and 190b on the boundaries of the cathode active-material coating layers can improve safety of the battery against burrs present on the cut face.

In the above-described first embodiment of the present invention as shown in FIGS. 3 and 4, the insulator tapes 190a and 190b are attached to the boundaries of the cathode active-material coating layers provided on the upper and lower surfaces of the cathode collector at the ending portion of the cathode, preventing short circuit between the anode active-material coating layer and a facing non-coating part not containing the cathode active-material coating layer.

Preferably, the insulator tapes 190a and 190b are attached to the boundaries of the cathode active-material coating layers during an electrode winding process or during fabrication of a large-width electrode.

In the present embodiment, the cathode lead 160 and the anode lead 170 are arranged in opposite directions, rather than being arranged in the same direction. In particular, the cathode collector is not provided at an opposite side of the cathode lead 160 with the cathode uncoated part, so as to prevent short circuit with the anode.

A separator 150 is positioned to further extend from the ending portion of the anode by a length of at least 5 mm or more. With this configuration, it is possible to prevent the anode active-material coating layer from being exposed to the outside even if the separator undergoes heat shrinkage.

Figure 5:
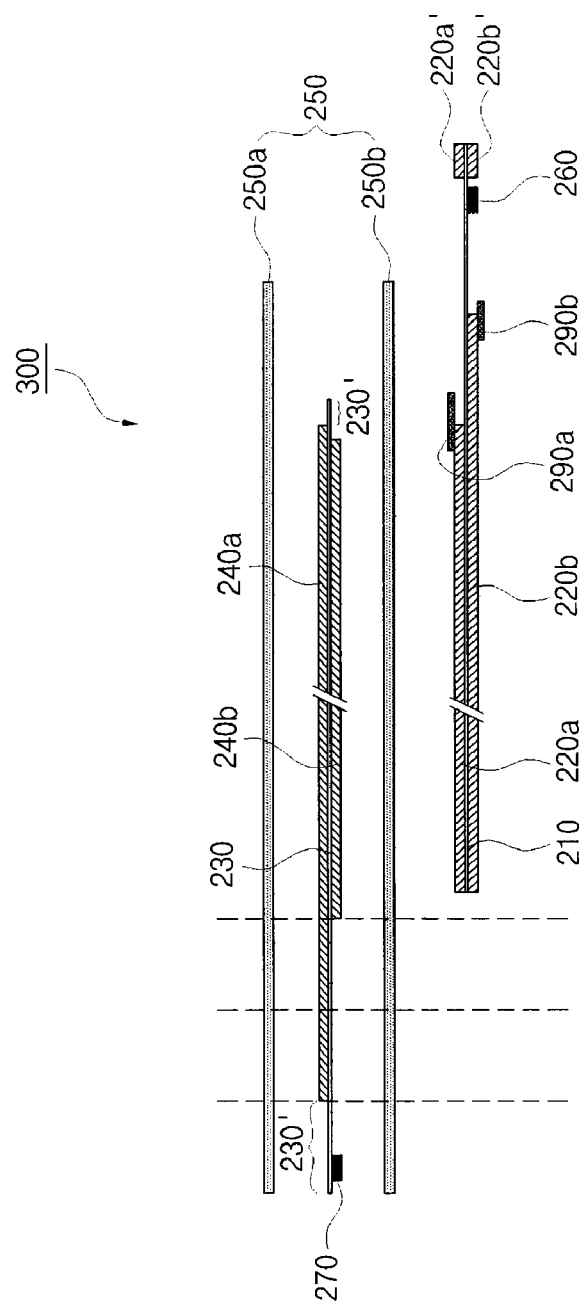
FIGS. 5 and 6 are views illustrating a configuration of a battery and a jelly-roll wound configuration of the battery according to a second embodiment of the present invention.
Figure 6:
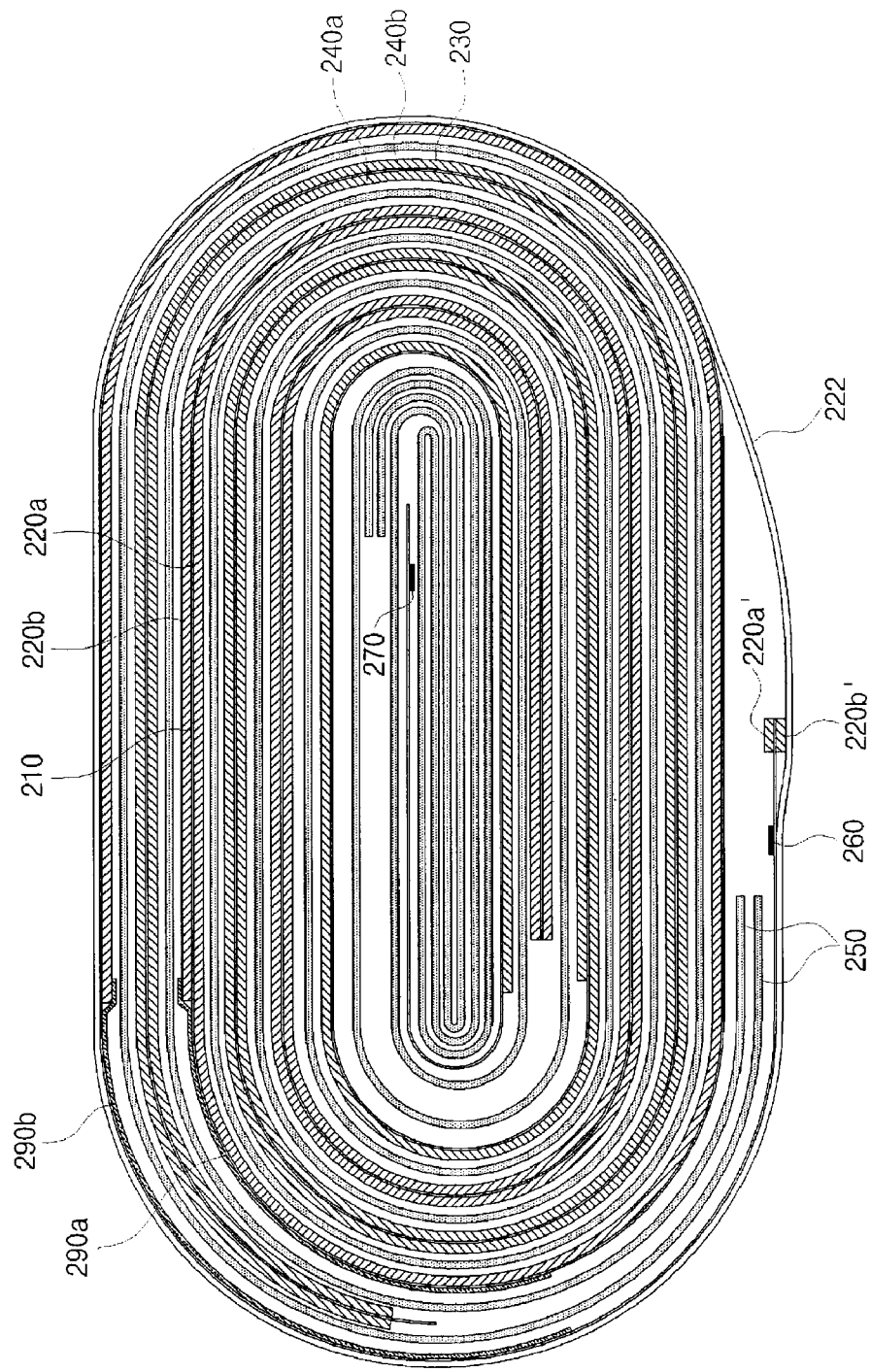

FIGS. 5 and 6 illustrate an exemplary second embodiment of the present invention. As compared to the previously described first embodiment, in the second embodiment of the present invention, cathode active-material coating layers 220a' and 220b' are further provided on upper and lower surfaces of a distal end of a cathode uncoated part where a cathode lead is installed.

Similar to the previously described first embodiment, a cathode does not contain a cathode uncoated part at a winding beginning portion thereof. As shown in FIG. 6, cathode active-material coating layers on the upper and lower surfaces of the cathode collector at a winding beginning portion of the cathode come into contact with anode active-material coating layers, respectively, with one layer of separator interposed therebetween. A tip end of the cathode may be realized via a one-step cutting method.

With provision of the additional cathode active-material coating layers 220a' and 220b' on the upper and lower surfaces of the distal end of the cathode uncoated part where a cathode lead 260 is installed, the present embodiment has no necessity for an insulator tape with respect to the cathode uncoated part.

The cathode lead 260 and an anode lead 270 are arranged in opposite directions, rather than being arranged in the same direction. In particular, the cathode collector is not provided at an opposite side of the cathode lead 260 with the cathode uncoated part, so as to prevent short circuit with the anode.

A separator 250 is positioned to further extend from the ending portion of the anode by a length of at least 5 mm or more (See the FIG. 6). With this configuration, it is possible to prevent the anode active-material coating layer from being exposed to the outside even if the separator undergoes heat shrinkage.

A cut face of an anode uncoated part 230' provided at a winding beginning portion of the anode is provided at opposite sides thereof with several layers of separators, achieving enhanced safety against burrs on the cut face. Further, with respect to a winding ending portion of the anode, although either side of a cut face of the anode uncoated part faces the cathode with only one layer of separator interposed therebetween, insulator tapes 290a and 290b are attached to boundaries of the cathode active-material coating layers, achieving enhanced safety of the battery against burrs present on the cut face.

In the above-described second embodiment of the present invention, similar to the previously described first embodiment, the insulator tapes 290a and 290b are attached to the boundaries of the cathode active-material coating layers provided on the upper and lower surfaces of the cathode collector at the ending portion of the cathode, preventing short circuit between the anode active-material coating layer and a facing non-coating part not containing the cathode active-material coating layer.

Preferably, the insulator tapes 290a and 290b are attached to the boundaries of the cathode active-material coating layers during an electrode winding process or during fabrication of a large-width electrode.

Figure 7:
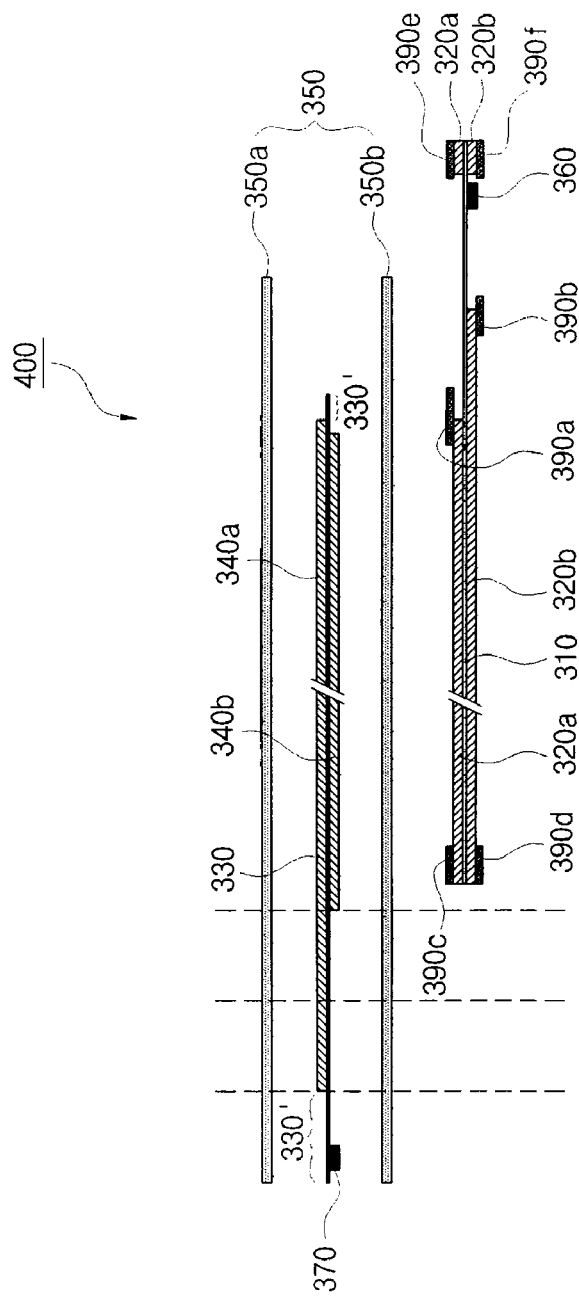
FIGS. 7 and 8 are views illustrating a configuration of a battery and a jelly-roll wound configuration of the battery according to a third embodiment of the present invention.
Figure 8:
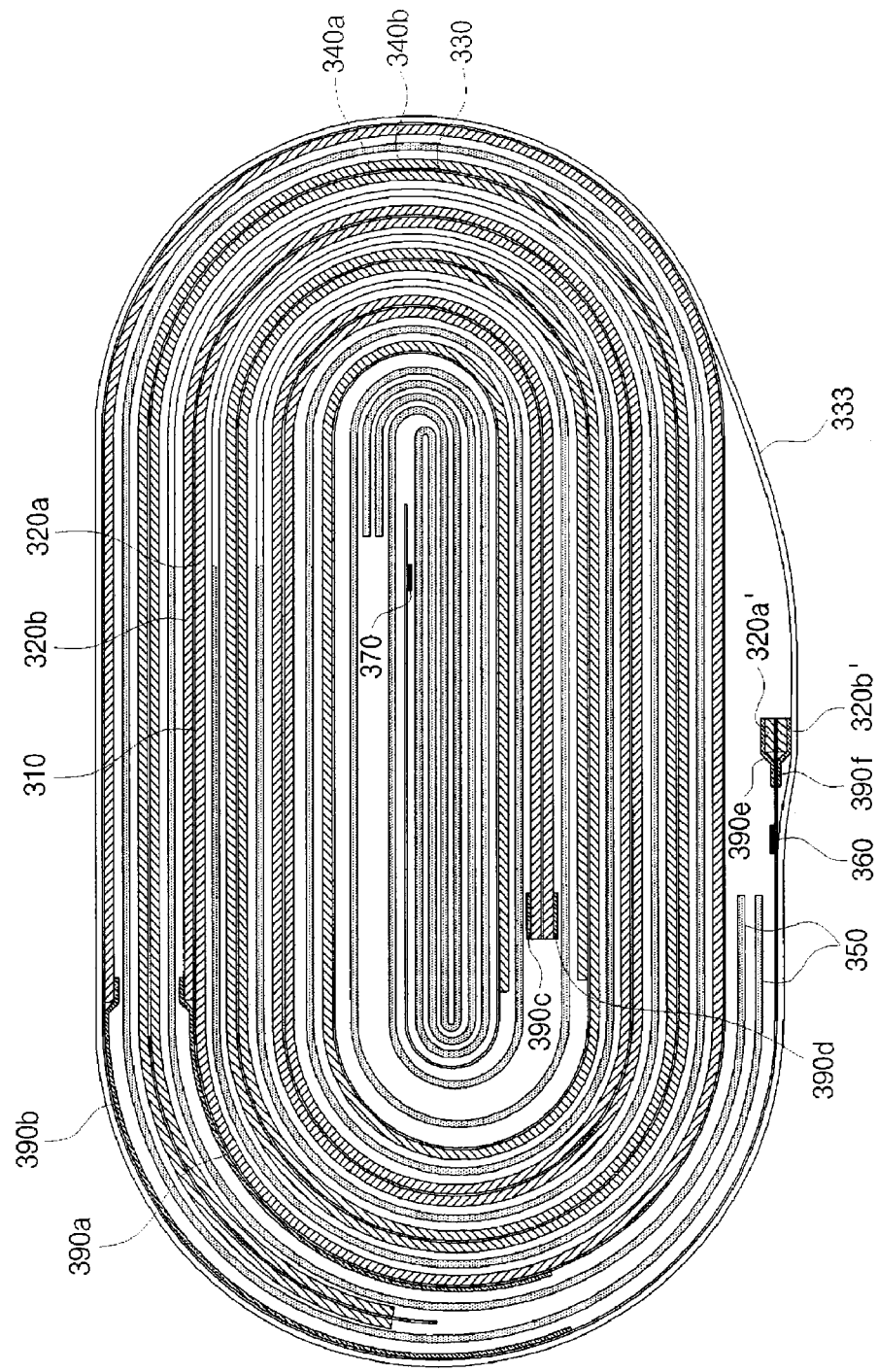

FIGS. 7 and 8 illustrate an exemplary third embodiment of the present invention. As compared to the previously described second embodiment, the present embodiment employs an increased number of insulator tapes. Specifically, insulator tapes 390c and 390d are attached to boundaries of cathode active-material coating layers on upper and lower surfaces of a cathode collector at a tip end of a cathode, and insulator tapes 390a and 390b are attached to boundaries of the cathode active-material coating layers on the upper and lower surfaces of the cathode collector at an ending portion of the cathode. In addition, insulator tapes 390e and 390f are attached to boundaries of cathode active-material coating layers 320a' and 320b' additionally provided on a distal end of a cathode uncoated part at the ending portion of the cathode. With provision of these insulator tapes, it is possible to prevent short circuit caused when the anode active-material coating layer faces a non-coating part of the cathode not containing the cathode active-material coating layer.

A cut face of an anode uncoated part 330' provided at the winding beginning portion of the anode is provided at opposite sides thereof with several layers of separators, achieving enhanced safety against burrs on the cut face. Further, with respect to the winding ending portion of the anode, although either side of a cut face of the anode uncoated part faces the cathode with only one layer of separator interposed therebetween, provision of the insulator tapes 390a and 390b can improve safety of the battery against burrs present on the cut face.

A cathode lead 360 and an anode lead 370 are arranged in opposite directions, rather than being arranged in the same direction. In particular, the cathode collector is not provided at an opposite side of the cathode lead 360 with the cathode uncoated part, so as to prevent short circuit with the anode.

A separator 350 is positioned to further extend from the ending portion of the anode by a length of at least 5 mm or more. With this configuration, it is possible to prevent the anode active-material coating layer from being exposed to the outside even if the separator undergoes heat shrinkage.

Figure 9:
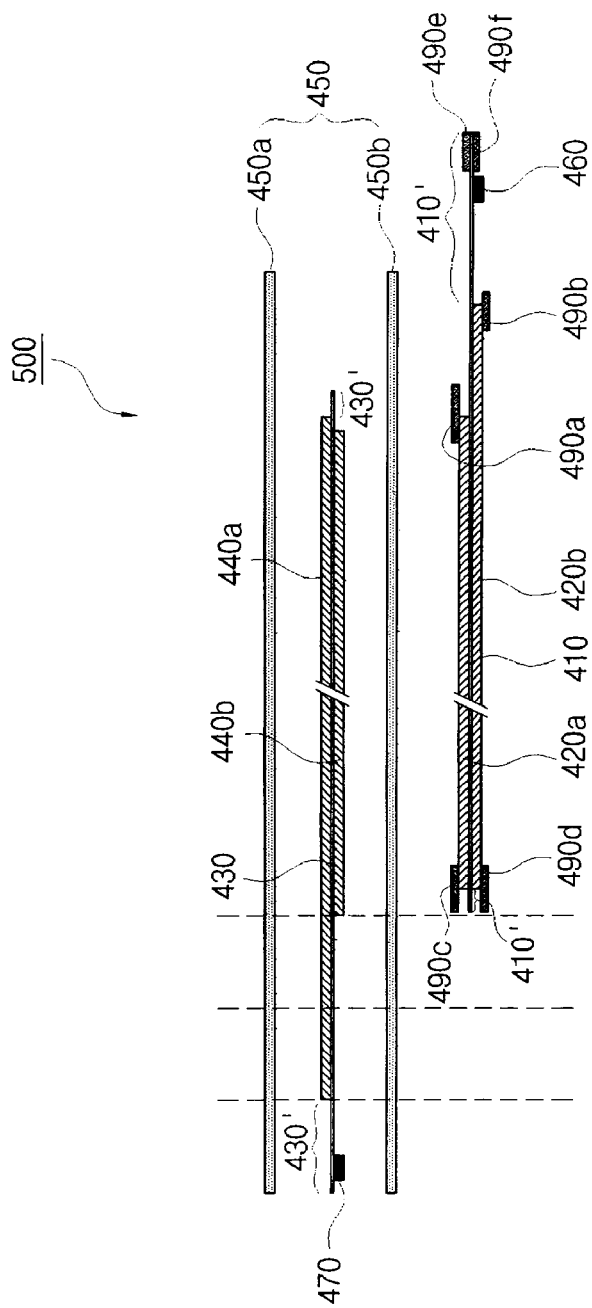
FIGS. 9 and 10 are views illustrating a configuration of a battery and a jelly-roll wound configuration of the battery according to a fourth embodiment of the present invention.
Figure 10:
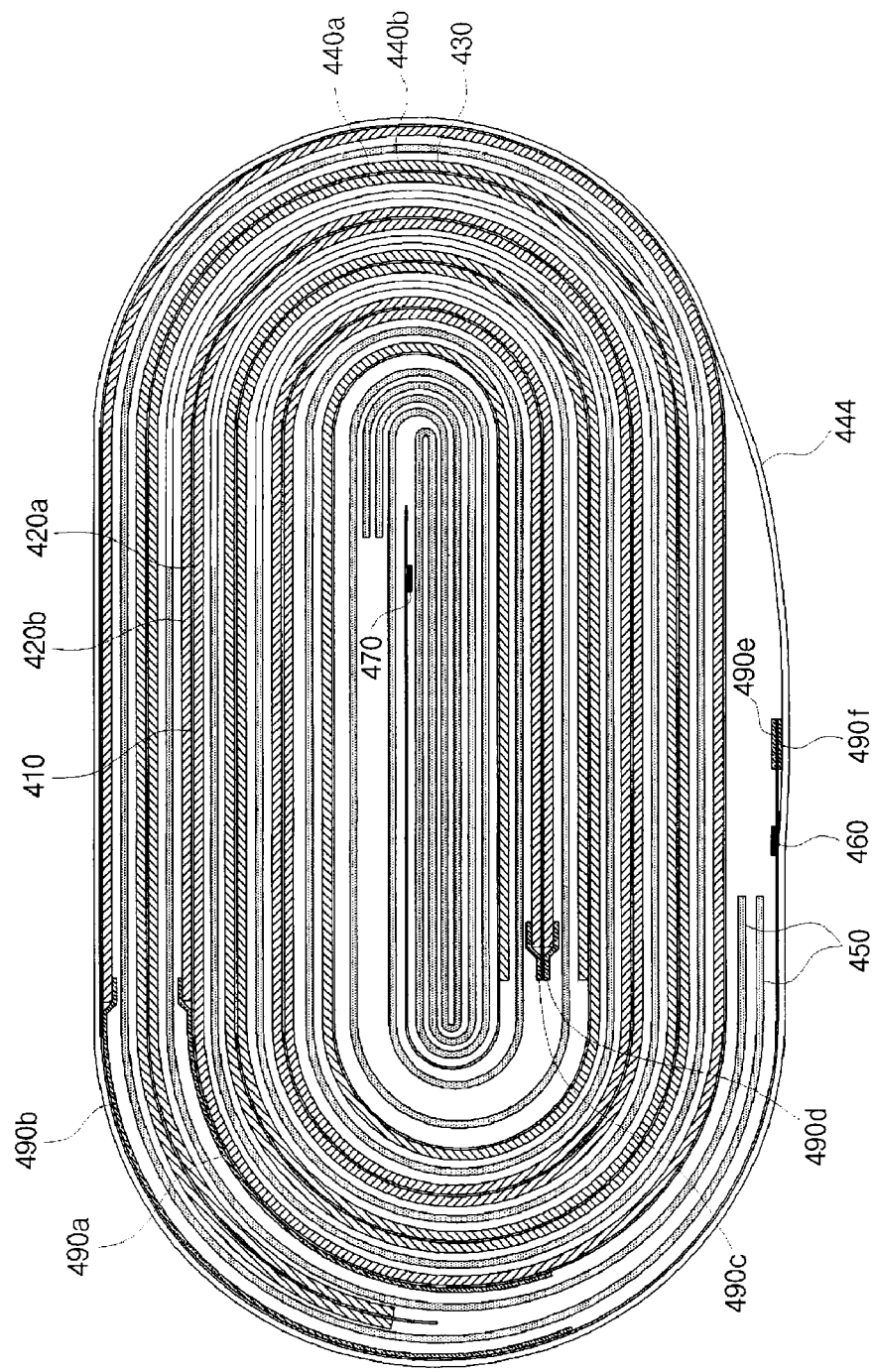

FIGS. 9 and 10 illustrate an exemplary fourth embodiment of the present invention. In the present embodiment, a cathode collector 410 is provided at both distal ends thereof with cathode uncoated parts 410' where no cathode active-material coating layer is present. Accordingly, cathode active-material coating layers begin to extend on upper and lower surfaces of the cathode collector from positions spaced apart from a winding beginning portion of the cathode by a predetermined distance. Upon winding, the winding beginning portion of the cathode comes into indirect contact with an anode active-material coating layer with one layer of separator interposed therebetween as shown in FIG. 10. In the present embodiment, to prevent short circuit caused when the cathode uncoated part faces the anode active-material coating layer, insulator tapes 490c and 490d are additionally attached to boundaries of cathode active-material coating layers on upper and lower surfaces of the cathode collector at a tip end of the cathode.

The winding beginning portion of the cathode is formed with a cathode uncoated part where no cathode active-material coating layer is present via a one-step cutting method.

To prevent electrical short circuit between the non-coating part not containing the cathode active-material coating layer and the anode active-material coating layer facing each other, insulator tapes 490a and 490b are attached to the cathode active-material coating layers provided on upper and lower surfaces of the cathode collector at an ending portion of the cathode, and insulator tapes 490e and 490f are attached to upper and lower surfaces of the cathode uncoated part at a distal end of the cathode collector where a cathode lead is installed.

A cut face of an anode uncoated part 430' provided at the winding beginning portion of the anode is provided at opposite sides thereof with several layers of separators, achieving enhanced safety against burrs on the cut face. Further, with respect to the winding ending portion of the anode, although either side of a cut face of the anode uncoated part faces the cathode with only one layer of separator interposed therebetween, provision of the insulator tapes 490a and 490b on the boundaries of the cathode active-material coating layers can improve safety of the battery against burrs present on the cut face.

Preferably, the insulator tapes 490a, 490b, 490c, 490d, 490e and 490f are attached to the boundaries of the cathode active-material coating layers during an electrode winding process or during fabrication of a large-width electrode.

A cathode lead 460 and an anode lead 470 are arranged in opposite directions, rather than being arranged in the same direction. Separators 450a and 450b are positioned to extend lengthwise beyond a distal end of the anode, in consideration of heat shrinkage of the separators 450a and 450b.

With the above-described configuration of the battery according to the present invention, the cut face of the anode uncoated part at a tip end of the anode as a winding beginning portion is insulated and protected by plural layers of separators interposed therebetween, and the cut face of the anode uncoated part at a distal end of the anode as a winding ending portion is protected by insulator tapes attached to the boundaries of the cathode active-material coating layers, resulting in a secondary battery having excellent electrical insulation capability.

Although the insulator tapes, used in the respective embodiments of the present invention, are not limited to special insulator tapes so long as they have excellent electrical insulation capability, materials having no heat shrinkage up to 200° C. are preferable. Further, using materials having slight shrinkage under the influence of heat is more preferable to prevent any troubles of a separator interposed between electrodes.

The insulator tapes may be one or more selected from the group consisting of polyimide tapes, acetate tapes, glass-cloth tapes, polyester tapes, polyphenylenesulfide (PPS) tapes and polypropylene tapes. Preferably, the insulator tapes are polyethylene terephthalate tapes.

Preferably, the insulator tapes provided in the battery according to the present invention have a thickness of 10 μm to 100 μm.

The jelly-roll wound configuration of the battery according to the present invention can be in the form of being surrounded by a closing tape (111, 222, 333 and 444) (See FIGS. 4, 6, 8 and 10).

Hereinafter, other constituent elements of the battery according to the present invention will be described, in particular, with respect to a secondary battery.

The cathode collector according to the present invention may be made of stainless steel, nickel, aluminum, titanium, or alloys thereof, or may have an aluminum or stainless steel surface treated with carbon, nickel, titanium, or silver. Of these various materials, aluminum or aluminum alloy is preferable.

Specific examples of a cathode active-material according to the present invention may include, but are not limited to; lamellar compounds such as lithium cobalt oxide ($LiCoO_2$), lithium nickel oxide ($LiNiO_2$), etc., or compounds substituted by one or more transition metals; lithium manganese oxide represented by chemical formula $Li_{1+x}Mn_{2-x}O_4$ (where, x is a value of 0~0.33), such as $LiMnO_3$, $LiMn_2O_3$, $LiMnO_2$, etc.; lithium copper oxide ($Li_2CuO_2$); $LiFe_3O_4$; vanadium oxide, such as $LiV_3O_8$, $V_2O_5$, $Cu_2V_2O_7$, etc.; Ni-site type lithium nickel oxide represented by chemical formula $LiNi_{1-x}M_xO_2$ (where, M is Co, Mn, Al, Cu, Fe, Mg, B or Ga, and x is a value of 0.01~0.3); lithium manganese composite oxide represented by chemical formula $LiMn_{2-x}M_xO_2$ (where, M is Co, Ni, Fe, Cr, Zn or Ta, and x is a value of 0.01~0.1) or $Li_2Mn_3MO_8$ (where, M is Fe, Co, Ni, Cu or Zn); $LiMn_2O_4$ in which Li in chemical formula is substituted by alkaline earth metal ions; disulfide compounds; $Fe_2(MoO_4)_3$, etc. Preferably, the cathode active-material may be lithium cobalt oxide, lithium manganese oxide, lithium nickel oxide, lithium manganese cobalt nickel oxide, or composites of two or more thereof.

The anode collector according to the present invention may be made of stainless steel, nickel, copper, titanium, or alloys thereof, or may have a copper or stainless steel surface treated with carbon, nickel, titanium, or silver. Of these various materials, aluminum or aluminum alloy is preferable.

Specific examples of an anode active-material according to the present invention may include, but are not limited to; carbon and graphite materials, such as natural graphite, artificial graphite, expanded graphite, carbon fiber, non-graphitizing carbon, carbon black, carbon nano-tubes, fullerenes, activated carbon, etc.; metals capable of being alloyed with lithium, such as Al, Si, Sn, Ag, Bi, Mg, Zn, In, Ge, Pb, Pd, Pt, Ti, etc. and compounds containing these elements; composites of metals and compounds thereof and carbon and graphite materials; lithium-based nitrides, etc. Preferably, the anode active-material may be only one or combinations of two or more selected from the group consisting of crystalline carbon, amorphous carbon, silicon-based active materials, tin-based active materials, and silicon-carbon-based active materials. In addition, a conventional binder, conductor, and additive may be added to the anode, and detailed examples or contents thereof are sufficient if they fulfill conventional levels.

The binder serves to assist coupling between the active material and the conductor as well as coupling between the active material and the collector, and may be added at 1 to 50 weight % based on the total weight of electrode compound mixture. Examples of the binder include polyvinylidenefluoride (PVDF), polyvinylalcohol, carboxymethyl-cellulose (CMC), starch, hydroxypropylcellulose, regenerated cellulose, polyvinylpyrrolidone, tetrafluoroethylene, polyethelene, polypropylene, ethylene-propylene-diene polymer (EPDM), sulfonized EPDM, styrene-butadiene rubber, fluoro rubber, and various copolymers thereof.

The conductor is a component to further improve conductivity of an electrode active material, and may be added at 1 to 20 weight % based on the total weight of electrode compound mixture. The conductor may be selected, without particular limitation, from materials, which have a desired conductivity and do not cause any chemical variation in the battery. Examples of the conductor may include graphite, such as natural graphite, artificial graphite, etc.; black matters, such as carbon black, acetylene black, Ketjen black, channel black, perneis black, lamp black, summer black, etc.; conductive fiber, such as carbon fiber, metal fiber, etc.; metal powders, such as fluorocarbon, aluminum, nickel powder, etc.; conductive whisker, such as zinc oxide, potassium titanate, etc.; conductive metal oxide, such as titanium oxide, etc.; polyphenylene derivative, etc.

The additive is selectively used to restrict expansion of the anode. The additive is selected, without particular limitation, from fibrous materials not causing a chemical variation in the battery. Examples of the additive include olefin-based polymers, such as polyethylene, polypropylene, etc.; and other fibrous materials, such as glass fiber, carbon fiber, etc.

The separator, interposed between the cathode and the anode, is an insulating thin-film having a high ion transmissivity and mechanical strength. Generally, the separator has ultra-fine pores having a diameter of 0.01 μm to 10 μm, and a thickness of the separator is within a range of 5 μm to 300 μm. For example, the separator may be composed of chemical-resistant and hydrophobic olefin-based polymers, such as polypropylene, etc.; sheets or non-woven fabrics made of glass fiber or polyethylene, etc.; and kraft paper, etc. Representative examples of currently commercially available separators include Celgard series products (Celgard™ 2400 & 2300) by Hoechest Celanese Corp., polypropylene separators by Ube Industries Ltd. or Pall RAI MFG Co., polyethylene-based separators by Tonen or Entek, etc.

As occasion demands, to enhance stability of the battery, a gel polymer electrolyte may be coated over the separator. Representative examples of gel polymers may include polyethyleneoxide, polyvinylidenefluoride, polyacrylonitrile, etc. When a solid electrolyte, such as polymers, etc., is used, the solid electrolyte may also serve as a separator.

The cathode lead and anode lead are attached, in an electrically conductive manner, to the cathode and anode via welding, such as laser welding, ultrasonic welding or resistant welding, or by use of a conductive adhesive. Protective tapes, made of insulating materials, are attached to the electrode leads, to prevent short circuit between the electrodes.

The present invention provides a prismatic battery obtained as the battery having the above-described configuration is received in a prismatic battery can together and then, a non-aqueous electrolyte is added.

The non-aqueous electrolyte contains lithium salt, and consists of a non-aqueous electrolyte solution and lithium salt. The non-aqueous electrolyte is selected from among a non-aqueous electrolyte solution, solid electrolyte, inorganic solid electrolyte, etc.

For example, the non-aqueous electrolyte solution may be an aprotic organic solvent, such as N-methyl-2-pyrollidinon, propylene carbonate, ethylene carbonate, butylene carbonate, dimethyl carbonate, diethyl carbonate, ethylmethyl carbonate, gamma-butyro lactone, 1,2-dimethoxy ethane, 1,2-diethoxy ethane, tetrahydroxy franc, 2-methyl tetrahydrofurane, dimethylsulfoxide, 1,3-dioxolene, 4-methyl-1,3-dioxene, diethylether, formamide, dimethylformamide, dioxolene, acetonitrile, nitromethane, methyl formic acid, methyl acetic acid, phosphoric acid triester, trimethoxy methane, dioxolene derivative, sulfolane, methyl sulfolane, 1,3-dimethyl-2-imidasolidinone, propylene carbonate derivative, tetrahydrofurane derivative, ethers, methyl propionic acid, ethyl propionic acid, etc.

For example, the organic solid electrolyte may be a polyethylene derivative, polyethylene oxide derivative, polypropylene oxide derivative, phosphoric acid ester polymer, polyagitation lysine, polyester sulfide, polyvinylalcohol, poly fluorovinylidene, polymers containing ionic disintegrators, etc.

The inorganic solid electrolyte, for example, may include Li-based nitrides, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc., halides, sulfates, etc.

The lithium salt is a material sufficiently soluble in the non-aqueous electrolyte and for example, may be $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroboranlithium, low-grade aliphatic carbonic acid lithium, 4-penyl-boric acid lithium, imides, etc.

For the purpose of enhancing charge and discharge characteristics, fire-retardancy, etc., for example, pyridine, triethylphosphite, triethanolamine, cyclic ether, ethylene diamine, n-glyme, hexa phosphoric acid tri amide, nitrobenzene derivative, sulfur, quinone imine colorant, N-substituted oxasolidinone, N,N-substituted imidasolidine, ethylene glycol dialkyl ether, ammonium salt, pyrrole, 2-methoxy ethanol, trichloro aluminum, etc. may be added to the non-aqueous electrolyte. As occasion demands, to endow incombustibility, a halogen containing solvent, such as tetrachlorocarbon, trifluoroethylene, etc., may be added to the non-aqueous electrolyte. Further, to improve high-temperature maintenance characteristics, carbon dioxide gas may be further added to the non-aqueous electrolyte.

Now, the fabrication of the prismatic lithium battery according to the present invention will be described in brief. First, an electrode group having an approximately oval cross section is prepared by winding a cathode and an anode with a separator interposed therebetween, the separator being made of a non-porous polyethylene film having a thickness of 20 µm. The electrode group is received in a prismatic aluminum battery can having the bottom and sidewall. The top of the battery can define an opening and has an approximately square form. Thereafter, an insulator tape to prevent short circuit between a cathode lead or anode lead and the battery can is prepared and additionally, insulator tapes are prepared at respective regions having a risk of short circuit. In the present invention, when an insulator tape is attached to a non-coating part containing no cathode active-material coating layer which faces an anode active-material coating layer, the insulator tape may be formed via an insulator tape attachment apparatus in a winding process, or may be attached by a length corresponding to a width of an electrode during an electrode coating process. Then, a spherical sealing member in which an anode terminal surrounded by an insulating gasket is centrally provided is disposed in the opening of the battery can, and the anode lead is connected to the anode terminal. The cathode lead is connected to a lower surface of the sealing member. As the sealing member is welded to the periphery of the opening via laser welding, the opening of the battery can is sealed. Thereafter, a non-aqueous electrolyte is injected into the battery can through an injection hole perforated in the sealing member. Finally, as the injection hole is blocked by a plug via welding, the fabrication of the prismatic lithium secondary battery is completed.

Figure 1:
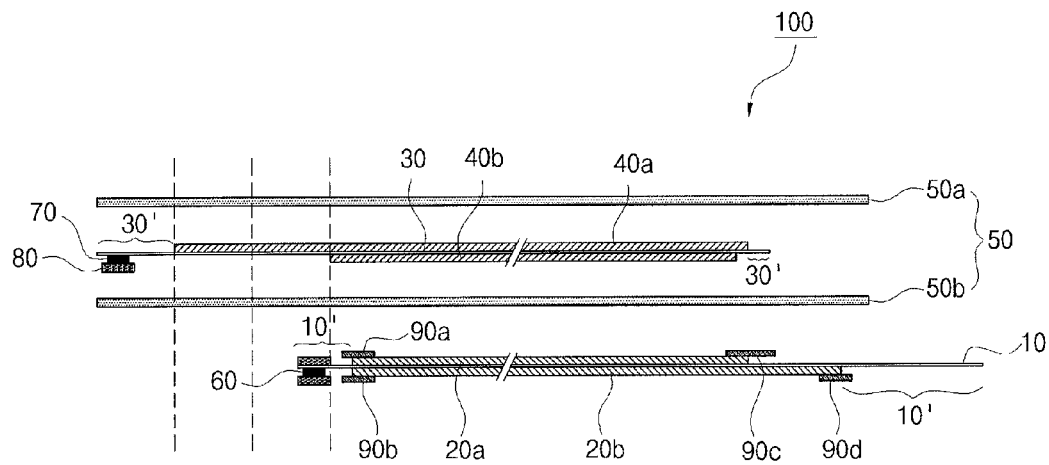
FIGS. 1 and 2 are views illustrating a configuration of a conventional battery and a jelly-roll wound configuration of the battery.
Figure 2:
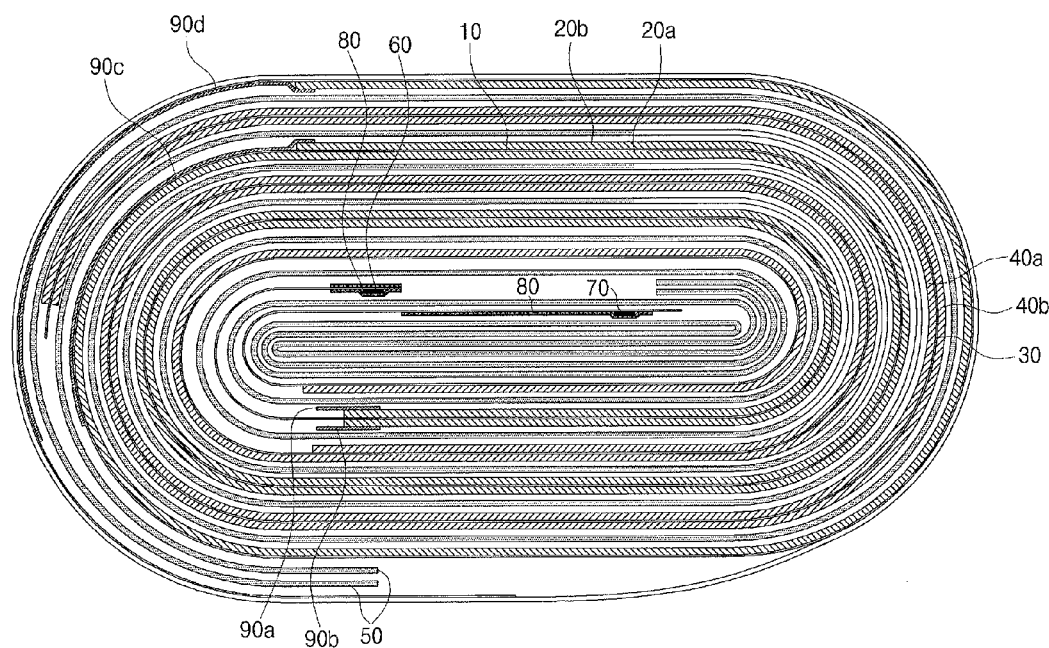

The batteries fabricated according to the first to fourth embodiments and the conventional battery as shown in FIG. 1 were subjected to stability estimation via a hot box test, and the results of which are shown in the following Table 1. Here, the hot box test was performed at 150° C. for 1 hour.

TABLE 1

| D | Result of Hot Box Test |
| --- | --- |
| Prior art | 2/30ea ignited |
| First Embodiment | 0/30ea ignited |
| Second Embodiment | 0/30ea ignited |
| Third Embodiment | 0/30ea ignited |
| Fourth Embodiment | 0/30ea ignited |

As can be seen from the results of the above Table 1, the prismatic battery fabricated according to the present invention has no risk of internal short circuit under any dangerous environment, achieving considerably enhanced safety of the battery.

MODE FOR THE INVENTION

Various embodiments have been described in the best mode for carrying out the invention.

INDUSTRIAL APPLICABILITY

The present invention is applicable to a lithium secondary battery for achieving enhanced electrical insulation capability and consequential safety of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying drawings.

The invention claimed is:
1. A battery comprising:
a cathode having a cathode active-material coating layer provided on at least one surface of a cathode collector; and
an anode having an anode active-material coating layer provided on at least one surface of an anode collector, the cathode and anode being wound to face each other with a separator interposed therebetween,
wherein both upper and lower surfaces of the cathode collector are provided with cathode active-material coating layers so as not to provide a cathode uncoated part at a winding beginning portion of the cathode, and the cathode uncoated part for installation of a cathode lead is provided only at a winding ending portion of the cathode, wherein an insulator tape is attached to the boundary of the cathode active-material coating layer facing the anode at the winding ending portion of the cathode, wherein a beginning portion of the insulator tape formed on the boundary surface of the cathode active-material coating layer begins from a location before a radius curvature area where the battery is wound, through an inflection point of the radius curvature area and is formed longer than an end portion of the anode, wherein the insulator tape is formed from the cathode active-material coating layer to the cathode uncoated part, wherein the beginning portion of the insulator tape is formed on an outermost periphery of the cathode collector being wound, wherein the anode is formed to have a mutually dislocated structure in which a beginning portion and an ending portion of the anode active-material coating layer coated on one surface of the anode collector are disposed in a different position from a beginning portion and an ending portion of the anode active-material coating layer coated on the other surface of the anode collector, respectively, wherein an anode lead is provided at a winding beginning portion of the anode, wherein the cathode lead and the anode lead of the battery are arranged in opposite directions, wherein the cathode lead and the anode lead are formed on a surface of the cathode and a surface of the anode which face each other, respectively, wherein further insulator tapes are attached to upper and lower surfaces of the cathode uncoated part at a distal end of the outermost periphery of the cathode collector where the cathode lead is installed, and wherein said further insulator tapes are not in contact with the cathode lead and the cathode active-material coating layer.

2. A battery comprising:

a cathode having a cathode active-material coating layer provided on at least one surface of a cathode collector; and an anode having an anode active-material coating layer provided on at least one surface of an anode collector, the cathode and anode being wound to face each other with a separator interposed therebetween, wherein both upper and lower surfaces of the cathode collector are provided with cathode active-material coating layers so as not to provide a cathode uncoated part at a winding beginning portion of the cathode, and the cathode uncoated part for installation of a cathode lead is provided only at a winding ending portion of the cathode, wherein an additional cathode active-material coating layer is provided on at least one surface of a distal end of the cathode uncoated-part, wherein an insulator tape is attached to the boundary of the cathode active-material coating layer facing the anode at the winding ending portion of the cathode, wherein a beginning portion of the insulator tape formed on the boundary surface of the cathode active-material coating layer begins from a location before a radius curvature area where the battery is wound, through an inflection point of the radius curvature area and is formed longer than an end portion of the anode, wherein the insulator tape is formed from the cathode active-material coating layer to the cathode uncoated part, wherein the beginning portion of the insulator tape is formed on an outermost periphery of the cathode collector being wound, wherein the anode is formed to have a mutually dislocated structure in which a beginning portion and an ending portion of the anode active-material coating layer coated on one surface of the anode collector are disposed in a different position from a beginning portion and an ending portion of the anode active-material coating layer coated on the other surface of the anode collector, respectively, wherein an anode lead is provided at a winding beginning portion of the anode, wherein the cathode lead and the anode lead of the battery are arranged in opposite directions, wherein the cathode lead and the anode lead are formed on a surface of the cathode and a surface of the anode which face each other, respectively, and wherein, on the basis of the winding beginning portion, further insulator tapes are attached to the boundaries of the cathode active-material coating layers at distal ends of both the upper and lower surfaces of the cathode collector and to the boundary of the cathode active-material coating layer at the distal end of the cathode uncoated part.

3. A battery comprising:

a cathode having a cathode active-material coating layer provided on at least one surface of a cathode collector; and an anode having an anode active-material coating layer provided on at least one surface of an anode collector, the cathode and anode being wound to face each other with a separator interposed therebetween, wherein cathode uncoated parts are provided at a winding beginning portion and winding ending portion of the cathode, respectively, such that a cathode lead is installed on at least one of the cathode uncoated parts provided at the winding beginning portion and winding ending portion, and an insulator tape is attached to a distal end of the cathode uncoated part where the cathode lead is installed, wherein an insulator tape is attached to the boundary of the cathode active-material coating layer facing the anode at the winding ending portion of the cathode, wherein a beginning portion of the insulator tape formed on the boundary surface of the cathode active-material coating layer begins from a location before a radius curvature area where the battery is wound, through an inflection point of the radius curvature area and is formed longer than an end portion of the anode, wherein the insulator tape is formed from the cathode active-material coating layer to the cathode uncoated part, wherein the beginning portion of the insulator tape is formed on an outermost periphery of the cathode collector being wound, wherein the anode is formed to have a mutually dislocated structure in which a beginning portion and an ending portion of the anode active-material coating layer coated on one surface of the anode collector are disposed in a different position from a beginning portion and an ending portion of the anode active-material coating layer coated on the other surface of the anode collector, respectively, wherein an anode lead is provided at a winding beginning portion of the anode, wherein the cathode lead and the anode lead of the battery are arranged in opposite directions, wherein the cathode lead and the anode lead are formed on a surface of the cathode and a surface of the anode which face each other, respectively, wherein the cathode lead is located at a winding ending portion of the cathode, and wherein, on the basis of the winding beginning portion, further insulator tapes are attached to the boundaries of the cathode active-material coating layers at distal ends of both the upper and lower surfaces of the cathode collector and to the distal end of the cathode collector where the cathode lead is installed.

4. The battery according to claim 1, wherein the cathode active-material coating layers on both the upper and lower surfaces of the cathode collector have the same beginning point at the winding beginning portion of the cathode, and have different lengths from each other at the winding ending portion of the cathode, whereby at least one surface of the cathode collector includes a non-coating part not containing the cathode active-material coating layer.

5. The battery according to claim 1, wherein, on the basis of the winding beginning portion, the insulator tape is attached to the boundaries of the cathode active-material coating layers at distal ends of both the upper and lower surfaces of the cathode collector.

6. The battery according to claim 1, wherein the insulator tape is provided during a winding process or electrode coating process.

7. The battery according to claim 1, wherein the anode is provided, on at least one of a winding beginning portion and winding ending portion thereof, with an anode uncoated part not containing the anode active-material coating layer for connection of an anode lead, and wherein the anode collector is provided, on one surface thereof opposite to the anode lead connected to the other surface thereof, with two or more insulating layers at a position corresponding to the anode lead.

8. The battery according to claim 1, wherein a cut face of an anode uncoated part provided at a tip end of the anode as a winding beginning portion is insulated and protected by a plurality of separators.

9. The battery according to claim 1, wherein the separator extends beyond the end portion of the anode.

10. The battery according to claim 9, wherein the separator further extends from the end portion of the anode by about 5 mm or more.

11. The battery according claim 1, wherein the insulator tape is one or more selected from the group consisting of a polyimide tape, acetate tape, glass cloth tape, polyester tape, polyphenylenesulfide (PPS) tape, and polypropylene tape.

12. The battery according to claim 11, wherein the insulator tape is a polyethylene terephthalate tape.

13. The battery according to claim 1, wherein the insulator tape has a thickness of about 10 μm to 100 μm.

14. A prismatic battery wherein the battery according to claim 1 is received in a prismatic battery can, and a non-aqueous electrolyte is further provided.

15. A prismatic battery wherein the battery according to claim 2 is received in a prismatic battery can, and a non-aqueous electrolyte is further provided.

16. A prismatic battery wherein the battery according to claim 3 is received in a prismatic battery can, and a non-aqueous electrolyte is further provided.

17. The battery according to claim 2, wherein the cathode active-material coating layers on both the upper and lower surfaces of the cathode collector have the same beginning point at the winding beginning portion of the cathode, and have different lengths from each other at the winding ending portion of the cathode, whereby at least one surface of the cathode collector includes a non-coating part not containing the cathode active-material coating layer.

* * * * *